United States Patent
Lim et al.

(10) Patent No.: US 10,816,959 B2
(45) Date of Patent: Oct. 27, 2020

(54) METHOD AND SYSTEM FOR COMPENSATING OFFSET OF RESOLVER

(71) Applicants: Hyundai Motor Company, Seoul (KR); Kia Motors Corporation, Seoul (KR)

(72) Inventors: Jae Sang Lim, Suwon-si (KR); Joo Young Park, Yongin-si (KR); Gu Bae Kang, Yongin-si (KR); Young Un Kim, Suwon-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/454,799

(22) Filed: Jun. 27, 2019

(65) Prior Publication Data
US 2020/0166908 A1 May 28, 2020

(30) Foreign Application Priority Data
Nov. 22, 2018 (KR) .......................... 10-2018-0145706

(51) Int. Cl.
| | | |
|---|---|---|
| G05B 19/31 | (2006.01) | |
| G05B 19/4105 | (2006.01) | |
| H02P 21/18 | (2016.01) | |
| H02P 27/12 | (2006.01) | |
| H02K 24/00 | (2006.01) | |
| H02P 21/22 | (2016.01) | |

(52) U.S. Cl.
CPC ......... *G05B 19/4105* (2013.01); *H02K 24/00* (2013.01); *H02P 21/18* (2016.02); *H02P 21/22* (2016.02); *H02P 27/12* (2013.01); *G05B 2219/41065* (2013.01)

(58) Field of Classification Search
CPC .. H02P 6/16; H02P 21/18; H02P 21/22; H02P 23/04; H02P 27/06; H02P 29/00; H02P 27/085; H02P 27/08; G05B 2219/37478
See application file for complete search history.

(56) References Cited

U.S. PATENT DOCUMENTS

| | | | | |
|---|---|---|---|---|
| 2003/0002299 | A1* | 1/2003 | Trzynadlowski ... | H02M 7/5395 363/21.1 |
| 2014/0346983 | A1* | 11/2014 | Kato ................... | H02P 21/0085 318/400.02 |
| 2015/0212511 | A1* | 7/2015 | Furutani .................. | H02P 6/16 318/632 |

FOREIGN PATENT DOCUMENTS

KR  10-2017-0068646 A  6/2017

* cited by examiner

*Primary Examiner* — Karen Masih
(74) *Attorney, Agent, or Firm* — Morgan, Lewis & Bockius LLP

(57) ABSTRACT

A method and a system for compensating an offset of a resolver, may include sampling an output signal of the resolver at a predetermined sampling frequency, comparing magnitudes of the sampled output signals of the resolver, when a difference in magnitude between the sampled output signals of the resolver is greater than a predetermined reference value, controlling the motor by a random pulse width modulation (RPWM) scheme in which switching frequencies of the switching elements in the inverter are arbitrarily changed, and compensating an offset of the resolver coupled to the motor while controlling the motor with the RPWM scheme.

8 Claims, 10 Drawing Sheets

METHOD AND SYSTEM FOR COMPENSATING OFFSET OF RESOLVER

CROSS REFERENCE TO RELATED APPLICATION

The present application claims priority of Korean Patent Application No. 10-2018-0145706 filed on Nov. 22, 2018, the entire contents of which is incorporated herein for all purposes by this reference.

BACKGROUND OF THE INVENTION

Field of the Invention

The present invention relates to a method and a system for compensating an offset of a resolver, and more particularly, to a method and a system for compensating an offset of a resolver, which are capable of improving accuracy of a resolver offset compensation by preventing synchronization of a sampling point of time for an output of a resolver with a switching point of time for an inverter providing a driving current to a motor, thereby minimizing distortion in the output of the resolver at the sampling point of time.

Description of Related Art

A motor control unit (MCU) is used to control a motor such as a synchronous motor or an induction motor used in an electric vehicle or a hybrid vehicle. The MCU performs an arithmetic operation to set a coordinate system according to a position of flux of the motor to control the motor. In the instant case, a resolver is used to detect an absolute position of a rotor of the motor.

The resolver is a kind of transformer which applies a magnetized voltage to a primary winding (input), and when a shaft is rotated, a magnetic coupling coefficient is varied such that a voltage with which an amplitude of a carrier is varied is output to a secondary winding (output).

The output voltage of the resolver is varied in sine and cosine states according to a rotation angle of the shaft, and a rotation angle of the resolver may be determined by reading a carrier amplitude ratio of the sine output and the cosine output.

The resolver which is operated according to the above-described principle may be used for detecting speed information and a phase of the motor and using position information related to the rotor to generate a torque command and a speed command for controlling the inverter.

Meanwhile, owing to various causes such as assembly tolerance between the resolver and the motor, inaccuracy in a position of an internal coil of the resolver, and the like, an offset occurs in the output of the resolver such that it is impossible to accurately measure an absolute position due to such an offset. Thus, there are various methods of measuring and compensating an offset of the resolver. To compensate such an offset of the resolver, an output signal of the resolver should be accurately recognized. However, owing to various causes, noise occurs in the output signal of the resolver and information on the output signal of the resolver is not accurately recognized such that a resolver offset compensation may not be appropriately performed.

When a large amount of noise is introduced at a point of time of sampling an output signal of the resolver, the output signal of the resolver is not accurately recognized. As described above, to read sine and cosine values which are varied from the output signal of the resolver, which is varied in sine and cosine states, it is necessary to sample a peak value of the output signal of the resolver. However, when a point of time at which the peak value of the output signal of the resolver is generated and a switching point of time of a switching device in an inverter providing a driving voltage to a motor coincide with each other, when the output signal of the resolver is sampled, a large amount of noise occurs due to influence of switching noise such that there occurs a problem in that the sampled value becomes inaccurate. In other words, when a sampling period of an output signal of the inverter is synchronized with a switching period of the switching device of the inverter, a large amount of noise is introduced into an output of the resolver such that there occurs a problem in that a large amount of errors occurs in an output signal of the resolver, which is being sampled.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a method and a system for compensating an offset of a resolver, which are configured for improving accuracy of a resolver offset compensation by preventing synchronization of a sampling point of time for an output of a resolver output with a switching point of time for an inverter providing a driving current to a motor, minimizing distortion of the output of the resolver at the sampling point of time.

According to one aspect, there is provided a method for compensating an offset of a resolver, which may include sampling an output signal of a resolver at a predetermined sampling frequency, comparing magnitudes of the sampled output signals of the resolver, when a difference between the magnitudes of the sampled output signals of the resolver is greater than a predetermined reference value, controlling a motor with a random pulse width modulation (RPWM) scheme for arbitrarily changing a switching frequency of a switching element in an inverter connected to the motor, and compensating an offset of the resolver coupled to the motor while controlling the motor with the RPWM scheme.

The sampling may include sampling the output signal of the resolver using a predetermined sampling frequency which is determined to sample the output signal of the resolver at a peak of the output signal of the resolver.

The comparing may include determining a difference between magnitudes of two consecutive sampled output signals of the resolver among magnitudes of sequentially sampled output signals of the resolver at the predetermined sampling frequency.

The predetermined reference value may be determined as a maximum value with which a difference between peak values of adjacent output signals of the resolver has in a state in which distortion is not present in an output of the resolver.

The compensating of the offset of the resolver may include, when a d-axis voltage of the motor becomes zero, determining an angle determined by the output signal of the resolver as the offset of the resolver coupled to the motor while controlling the motor to put a d-axis current and a q-axis current of the motor into zero.

According to another aspect, there is provided a system for compensating an offset of a resolver, which provides an output signal for determining a rotation angle of a motor driven by receiving alternating-current (AC) power converted by switching of a switching element in an inverter connected to the motor, the system including a sampler configured to sample an output signal of the resolver at a predetermined sampling frequency, a modulation scheme determiner configured to compare magnitudes of the sampled output signals of the resolver, and when a difference between the magnitudes of the sampled output signals of the resolver is greater than a predetermined reference value, control a motor with a random pulse width modulation (RPWM) scheme for arbitrarily changing a switching frequency of the switching element in the inverter, and a resolver offset calculator configured to determine the offset of the resolver on a basis of the output signal of the resolver while driving the motor with a modulation scheme determined by the modulation scheme determiner.

The sampler may sample the output signal of the resolver using the predetermined sampling frequency which is determined to sample the output signal of the resolver at a peak of the output signal of the resolver.

The modulation scheme determiner may determine a difference between magnitudes of two consecutive sampled output signals of the resolver among magnitudes of sequentially sampled output signals of the resolver at the predetermined sampling frequency.

The predetermined reference value may be determined as a maximum value with which a difference between peak values of adjacent output signals of the resolver has in a state in which distortion is not present in an output of the resolver.

When a d-axis voltage of the motor becomes zero, the resolver offset calculator may determine an angle determined by the output signal of the resolver as the offset of the resolver coupled to the motor while controlling the motor to put a d-axis current and a q-axis current of the motor into zero.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
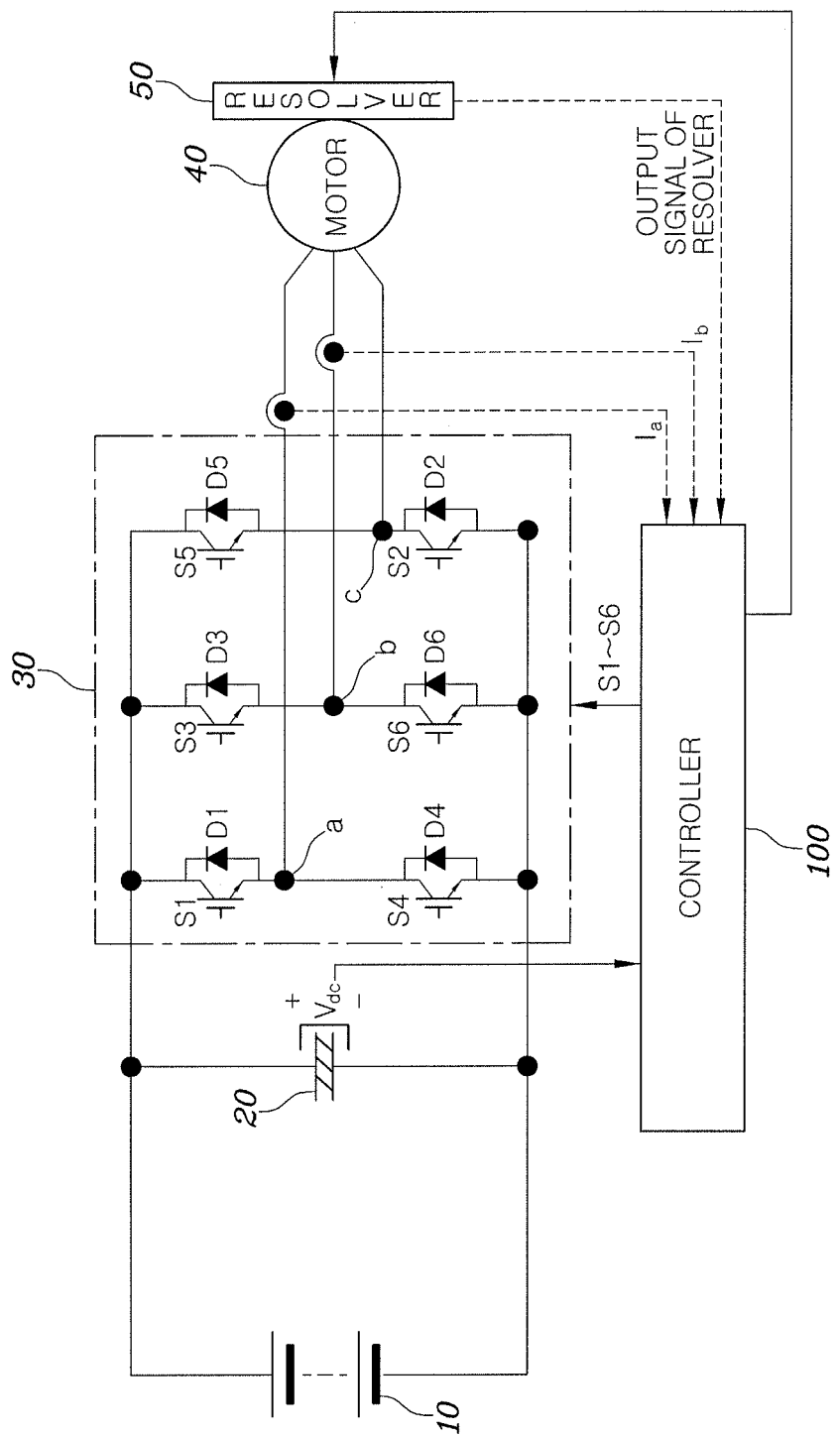
FIG. 1 is a block diagram illustrating an example of a motor drive system to which a method and a system for compensating an offset of a resolver according to an exemplary embodiment of the present invention is applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION OF THE DISCLOSURE

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a method and a system for compensating an offset of a resolver according to various embodiments of the present invention will be described in more detail with reference to the accompanying drawings.

FIG. 1 is a block diagram illustrating an example of a motor drive system to which a method and a system for compensating an offset of a resolver according to an exemplary embodiment of the present invention is applied;

Referring to FIG. 1, a motor drive system to which the method and the system for compensating an offset of a resolver according to an exemplary embodiment of the present invention is applied may include an energy storage device 10, a direct-current (DC) link capacitor 20 connected to both end portions of the energy storage device 10, an inverter 30 configured to convert a DC voltage applied to both end portions of the DC link capacitor 20 into a three-phase alternating-current (AC) voltage for driving a motor 40, the motor 40 configured to receive the three-phase AC voltage provided from the inverter 30 and generate a rotational force, a resolver 50 configured to detect an angle of a rotor of the motor 40, and a controller 100.

The energy storage device 10 outputs DC power as a component, such as a battery, for storing electrical energy in a form of a DC for driving the motor 40.

The DC link capacitor 20 is connected to both of the end portions of the energy storage device 10 to form a DC link voltage $V_{dc}$ through charging. The DC link voltage $V_{dc}$ becomes an input voltage of the inverter 30.

The inverter 30 is a component for converting the DC power stored in and provided from the energy storage device 10 into AC power for driving the motor 40 and may include a plurality of switching elements S1 to S6, each of which ON/OFF states are controlled by a pulse width modulation (PWM) signal provided from the controller 100. Switching of the inverter 30 may be understood to mean switching of the switching elements S1 to S6 provided in the inverter 30.

The motor 40 is a component for receiving three-phase AC power supplied from the inverter 30 to generate a rotational force and may employ various types of motors known in the art. In an eco-friendly vehicle, the motor 40 may be referred to as a drive motor as a motor configured for providing a rotational force to a driving wheel of the eco-friendly vehicle.

The resolver 50 is an element for detecting a position of the rotor of the motor, that is, a rotation angle thereof. The resolver 50 is a kind of transformer which applies a magnetized voltage to a primary winding (input), and when the rotor of the motor is rotated, a magnetic coupling coefficient is varied such that a voltage with which an amplitude of a carrier is varied is output to a secondary winding (output). An output voltage of the resolver 50 is varied in sine and cosine states according to a rotation angle of the shaft, and a rotation angle of the resolver 50 may be determined by reading a carrier amplitude ratio of a sine output and a cosine output.

To control a torque or a rotation speed of the motor 40 to a desired value (a torque command or a speed command), the controller 100 may basically perform PWM method control for appropriately adjusting a duty cycle (duty ratio) of each of the switching elements S1 to S6 of the inverter 30. The controller 100 may provide an input signal (magnetized voltage) to the resolver 50 and receive an output signal of the resolver 50 as a response thereto to determine a rotation angle of the motor 40.

Furthermore, the controller 100 derives information related to a current actually provided to the motor 40 being driven on a basis of rotation angle information related to the motor 40 derived from the output signal of the resolver 50 and detected values $I_a$ and $I_b$ of a current provided to the motor 40. The controller 100 generates PWM signals for controlling switching of the switching elements S1 to S6 in the inverter 30 to allow the motor 40 to output a value corresponding to a torque command or a speed command on a basis of a result of comparing a current command derived on a basis of the torque command or the speed command for the motor 40 with the information current actually provided to the motor 40 being driven.

In an exemplary embodiment of the present invention, the controller 100 may appropriately select a PWM for controlling ON/OFF of the switching elements S1 to S6 in the inverter 30 to determine an offset of the resolver 50.

Figure 2:
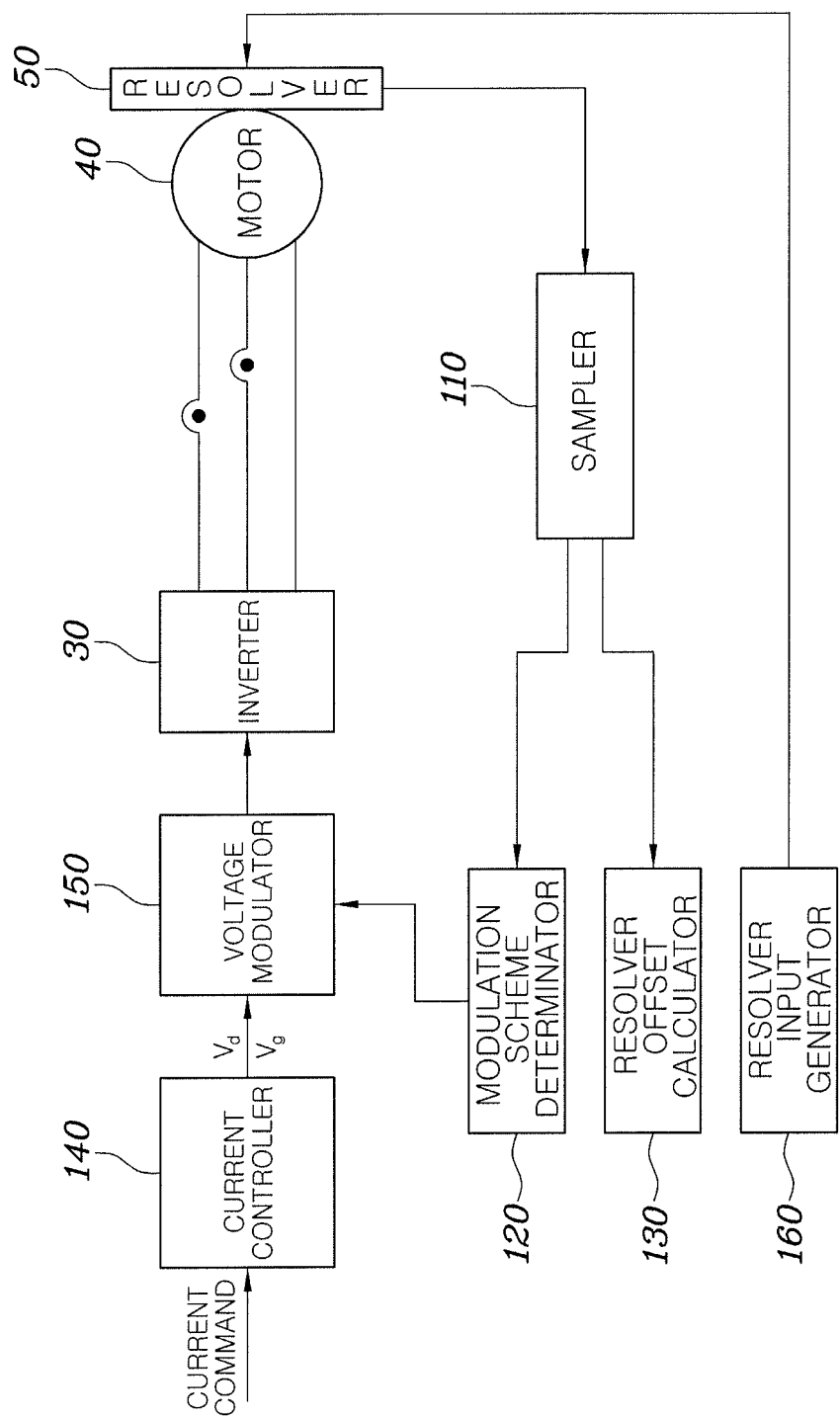
FIG. 2 is a detailed block diagram illustrating a configuration related to determination of the offset of the resolver in a controller of the motor drive system shown in FIG. 1.

FIG. 2 is a detailed block diagram illustrating a configuration related to determination of the offset of the resolver in a controller of the motor drive system shown in FIG. 1.

Referring to FIG. 2, the controller 100 may include a sampler 110 configured to sample an output signal of the resolver 50, a modulation scheme determiner 120 configured to determine a PWM scheme for controlling the switching elements S1 to S6 of the inverter 30 during an offset of the resolver 50 is determined on a basis of a sampled value in the sampler 110, and a resolver offset calculator 130 configured to determine the offset of the resolver 50 on a basis of the sampled values in the sampler 110.

Furthermore, the controller 100 may further include a current controller 140 configured to generate a voltage command by performing current control to direct a current output from the inverter 30 to follow a current command determined on a basis of the torque command or the speed command, a voltage modulator 150 configured to generate a PWM signal for controlling the switching elements S1 to S6 in the inverter 30 on a basis of the voltage command, and a resolver input generator 160 configured to generate an input signal for the resolver 50.

The current controller 140 may receive a current command corresponding to the torque command or the speed command input from the outside thereof and compare a value obtained by feedback of an actual output current of the inverter 30 with the current command to generate voltage commands $V_d$ and $V_q$ for directing the output current of the inverter 30 to follow the current command. The current controller 140 may employ a proportional-integral controller or the like well-known in the art.

The voltage modulator 150 may output a PWM for controlling the switching elements S1 to S6 of the inverter 30 to allow the inverter 30 to output a voltage corresponding to the voltage commands $V_d$ and $V_q$. In an exemplary embodiment of the present invention, while the resolver 50 determines the offset, the voltage modulator 150 may control the motor 40 by selectively applying a random PWM (RPWM) scheme according to the determination result of the modulation scheme determiner 120.

In the example shown in FIG. 2, contents related to a coordinate conversion of a current and a voltage required for controlling the switching elements S1 to S6 of the inverter 30 (e.g., a conversion between p-q coordinates and a-b-c coordinates) are omitted. Since the contents of the present coordinate conversion are already known in the art, a detailed description thereof will be omitted below.

A method of compensating an offset of a resolver according to various embodiments of the present invention is implemented by the system configured as described above.

Figure 3:
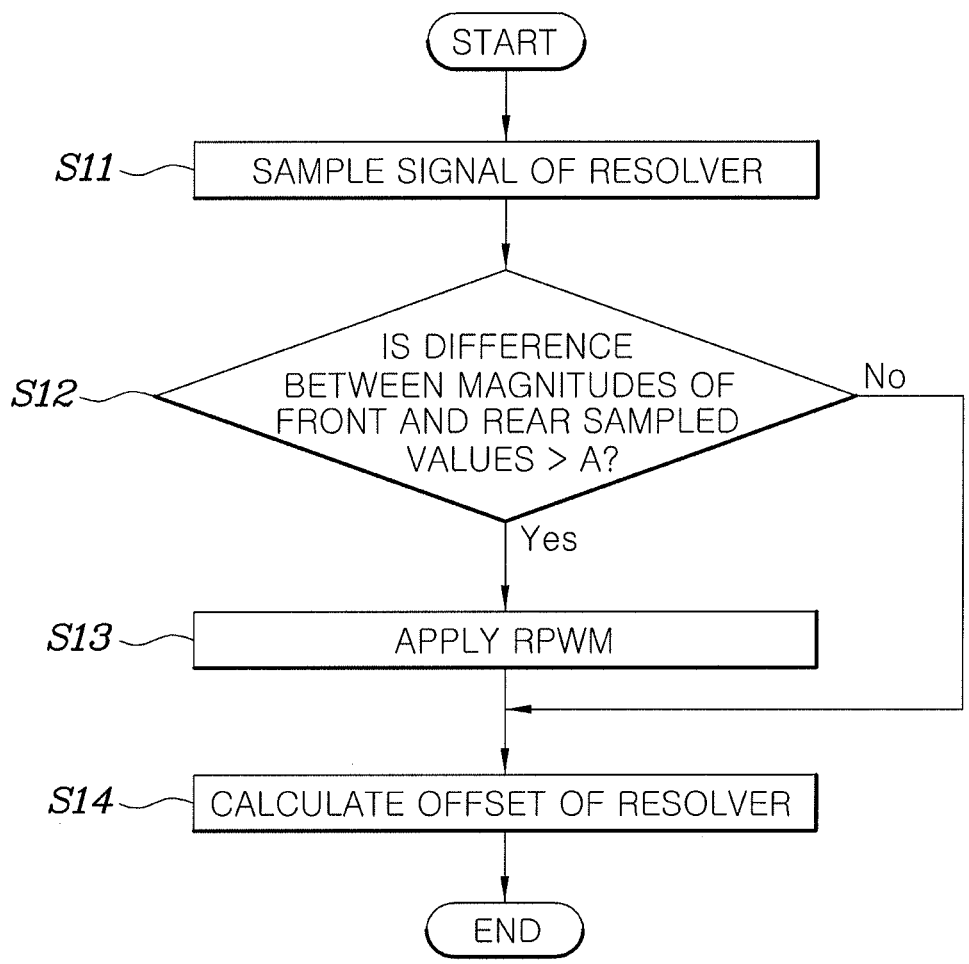
FIG. 3 is a flowchart illustrating the method of compensating an offset of a resolver according to an exemplary embodiment of the present invention.

FIG. 3 is a flowchart illustrating the method of compensating an offset of a resolver according to an exemplary embodiment of the present invention.

Referring to FIG. 3, the method of compensating an offset of a resolver according to an exemplary embodiment of the present invention may include sampling an output signal of the resolver 50 at a predetermined sampling frequency (S11), comparing magnitudes of the sampled output signals of the resolver 50 (S12), when a difference in magnitude between the sampled output signals of the resolver 50 is greater than a predetermined reference value, controlling the motor 40 by an RPWM scheme in which switching frequencies of the switching elements S1 to S6 in the inverter 30 are arbitrarily changed (S13), and compensating an offset of the resolver 50 while controlling the motor 40 with the RPWM scheme (S14). Alternatively, when a difference in magnitude between the output signals of the resolver 50 is less than or equal to the predetermined reference value in the operation S12, the operation S14 may be determining the offset of resolver 50 while controlling the motor 40 by applying other scheme (a predetermined PWM scheme when the motor 40 is driven during a vehicle is driving) instead of the RPWM scheme.

In the operation S11, the sampler 110 samples the output signal of the resolver 50 according to a predetermined sampling frequency. The sampler 110 may be implemented by an analog-to-digital converter which samples the output signal of the resolver 50 according to the predetermined sampling frequency and converts the sampled value into a digital value which usable in a digital type processor.

Figure 4:
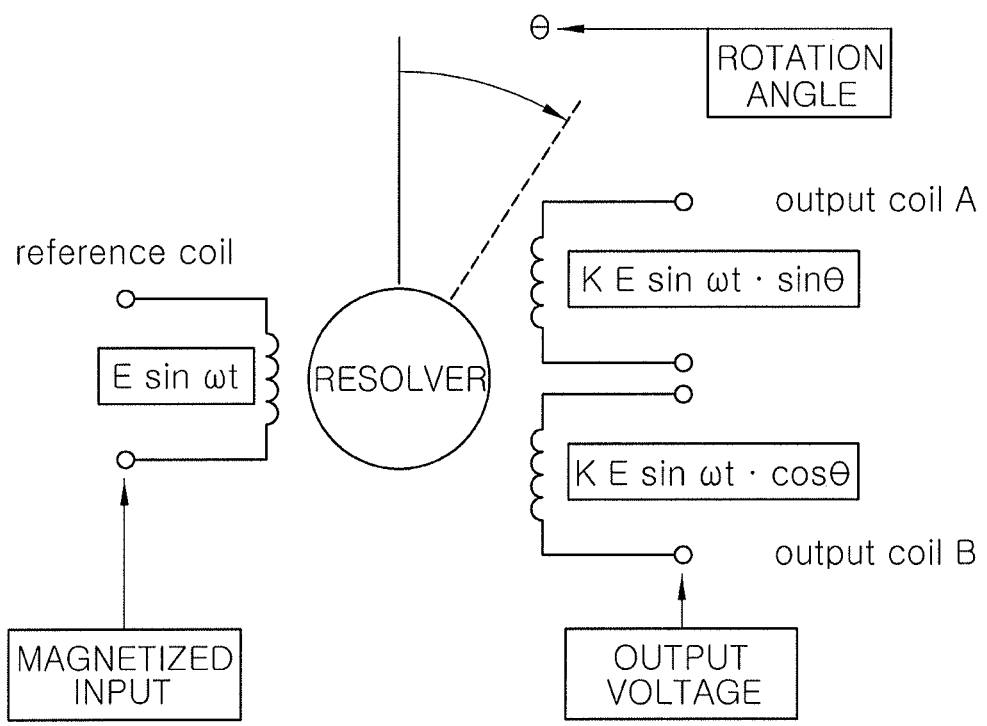
FIG. 4 is a diagram schematically illustrating a structure of a conventional resolver.
Figure 5:
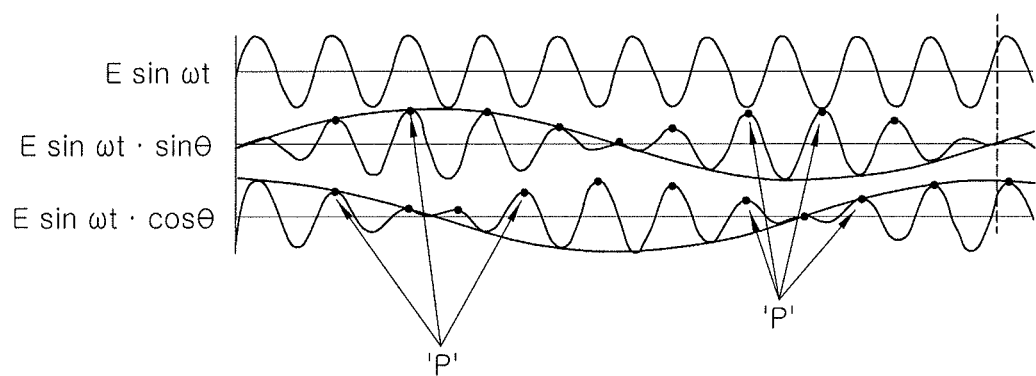
FIG. 5 is a diagram for describing an output signal of the conventional resolver.

FIG. 4 is a diagram schematically illustrating a structure of a conventional resolver, and FIG. 5 is a diagram for describing an output signal of the conventional resolver.

Referring to FIG. 4 and FIG. 5, when a magnetized voltage (input signal) of "E·sin ωt" is applied to an input terminal of a resolver (i.e., a reference coil) in the resolver input generator 160 of FIG. 2 in the controller 100 of FIG. 1, two output coils output signals, i.e., "K·E·sin ωt·sin θ" and "K·E·sin ωt·cos θ" of which amplitudes are varied according to sine and cosine values of a rotation angle θ of the motor 40. In formulas, E is a constant denoting a magnitude (amplitude) of a magnetized voltage, ω denotes a rotational angular velocity of the motor 40, and K is a constant denoting a transformation ratio of the resolver.

Since an operation of the resolver is well-known in the art so that an additional description thereof will be omitted.

In the operation S11, to detect the rotation angle θ of the motor 40, the sampler 110 samples the output signal of the resolver 50 of which an amplitude is varied along a curve of stn θ and a peak value P of the output signal of the resolver 50 of which an amplitude is varied along a curve of cos θ.

Next, in the operation S12, to determine a PWM scheme which will be applied during the offset of the resolver 50 is determined, the modulation scheme determiner 120 determines a difference between two front and rear values among sampled values of the output signal of the resolver 50, which is output from the sampler 110.

Figure 6:
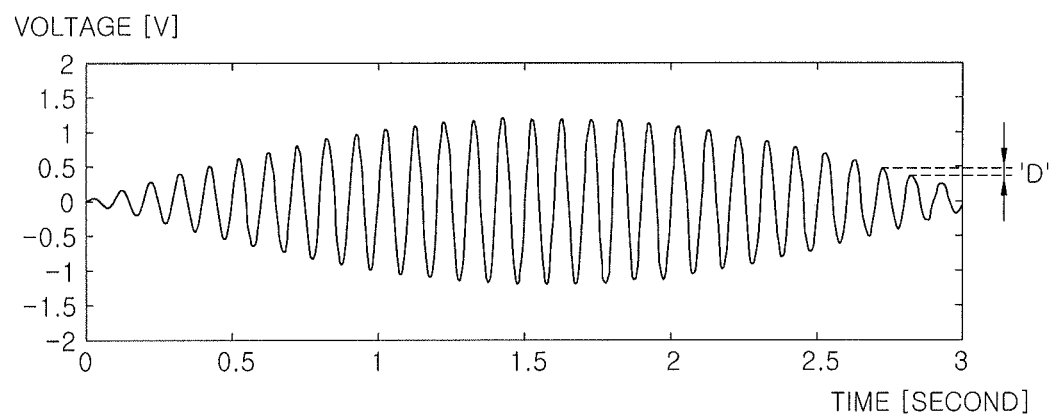
FIG. 6 is a diagram comparing a normal output signal of a resolver in which noise is not present with an abnormal output signal of the resolver in which noise is added.
Figure 6:
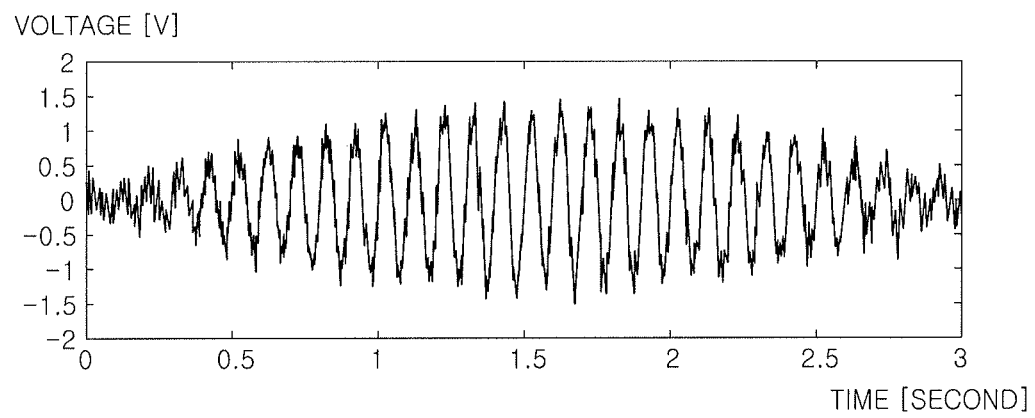

FIG. 6 is a diagram comparing a normal output signal of a resolver in which noise is not present with an abnormal output signal of the resolver in which noise is added.

As shown in an upper graph of FIG. 6, the normal output signal of the resolver 50 is a signal of which an amplitude is varied according to the sine value or the cosine value of the rotation angle e of the motor 40. However, as shown in a lower graph of FIG. 6, when noise is added, the amplitude of the output signal of the resolver 50 is varied according to the sine value or the cosine value of the rotation angle e of the motor 40, but distortion occurs in a value of the amplitude thereof due to noise.

Therefore, an upper limit value of a difference D between the front and rear peaks of the output signal of the resolver 50 is determined to be constant. However, when distortion occurs due to noise, the difference D between the front and rear peaks of the output signal of the resolver 50 exhibits a value which is greater than a value in a case in which the output signal of the resolver 50 is normal.

Such noise occurs severely when the switching elements S1 to S6 in the inverter 30 are switched. In the case of the PWM scheme for switching the switching elements S1 to S6 at a constant frequency, when a point of time of sampling the peak of the output signal of the resolver 50 coincides with a point of time when the switching occurs due to the PWM scheme at a constant frequency, i.e., when a sampling period of the output signal of the inverter 30 is synchronized with a switching period of the switching elements S1 to S6 of the inverter 30, sever distortion occurs in the value obtained by sampling the output signal of the resolver 50.

The various embodiments of the present invention prevent synchronization between the sampling period of the output signal of the inverter 30 and the switching period of the switching elements S1 to S6 of the inverter 30, preventing distortion of the sampled value of the output signal of the inverter 30 due to noise.

Figure 7:
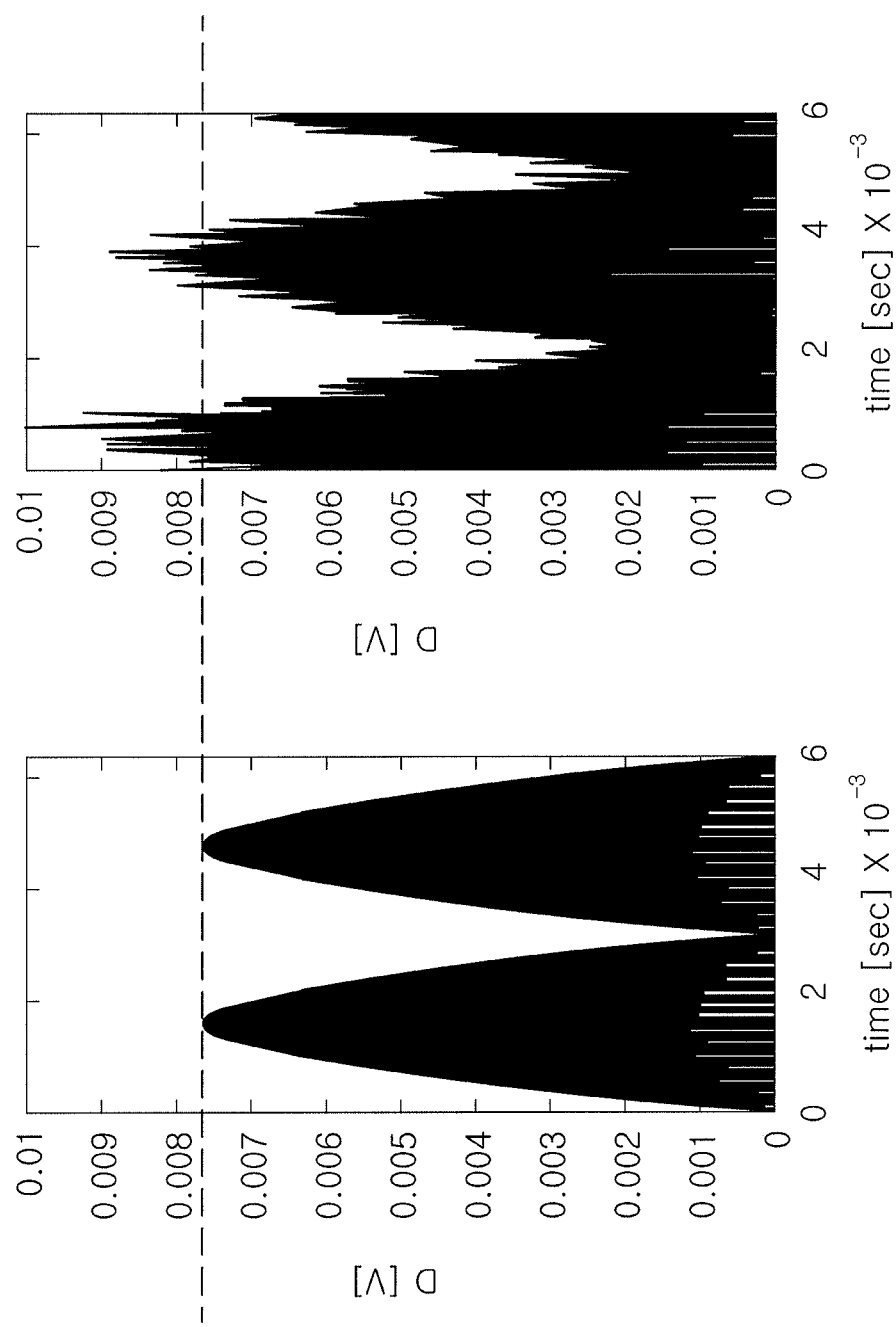
FIG. 7 is graphs showing a difference between values of front and rear peaks in the normal output signal of the resolver and a difference between values of front and rear peaks in the abnormal output signal of the resolver in which noise is added.

FIG. 7 is graphs showing a difference between values of front and rear peaks in the normal output signal of the resolver and a difference between values of front and rear peaks in the abnormal output signal of the resolver in which noise is added.

As shown in a left graph of FIG. 7, in the case of the normal output signal of the resolver 50 in which noise is not present, the difference D between the front and rear peaks becomes less than a predetermined maximum value. However, as shown in an right graph of FIG. 7, in the case of a distorted output signal of the resolver 50 in which noise is added, a difference between values of the front and rear peaks exceeding the predetermined maximum value of the difference D between the values of the front and rear peaks of the normal output signal of the resolver 50 is present.

In consideration of the phenomenon shown in FIG. 7, in the operation S12, when a difference between two front and rear values obtained by sampling the output signal of the resolver 50 is greater than a predetermined maximum value A with which a difference D between two consecutive sampled values of the normal output signal of the resolver 50 may have, it is determined that distortion occurs in the consecutive sampled values due to noise.

In the operation S12, the predetermined maximum value A with which a reference value compared with the difference of the two front and rear sampled values, i.e., the difference D between the two consecutive sampled values of the normal output signal of the resolver 50 may have, may be experimentally determined in advance.

When the difference D between the two consecutive sampled values of the output signal of the resolver 50 is greater than the predetermined reference value an in the operation S12, in the operation S13, the modulation scheme determiner 120 directs the voltage modulator 150 to control the motor 40 with the RPWM scheme, and the voltage modulator 150 controls the motor 40 with the RPWM scheme by driving the switching elements S1 to S6 in the inverter 30 with the RPWM scheme.

The RPWM scheme is a PWM scheme for arbitrarily changing ON/OFF frequencies of the switching elements S1 to S6 in the inverter 30.

As the PWM scheme for controlling the motor 40, a PWM scheme for changing ON/OFF states of the switching elements S1 to S6 in the inverter 30 of a fixed frequency is mainly applied. The fixed-frequency PWM scheme has excellent controllability with simplified control and is mainly used to control the motor 40 because the motor drive system is stably controlled. However, as described above, when the switching point of time for changing the ON/OFF states of the switching elements S1 to S6 is synchronized with the sampling point of time of the output signal of the resolver 50, severe distortion occurs in the output signal of the resolver 50 due to switching noise such that determination of the offset of the resolver 50 is not performed normally.

Consequently, according to various embodiments of the present invention; when the offset of the resolver 50 is determined, front and rear values among the sampled values of the output signal of the resolver 50 are compared, and according to the comparison result, the RPWM scheme in which a switching frequency band of the switching elements S1 to S6 in the inverter 30 is instantly distributed is applied (S13).

The RPWM scheme is well-known in the art and various techniques for determining variation of the switching frequency and the like are known. The RPWM scheme applied in the operation S13 may employ any RPWM scheme known in the art.

Next, in the operation S14, the resolver offset calculator 130 may determine the offset of the resolver 50 while controlling the motor 40 by applying the RPWM scheme.

Various techniques for determining the offset of the resolver 50 are already well-known in the art. For example, a rotation angle of the motor 40 determined by an output signal of the resolver 50, which is determined when a d-axis voltage of the motor 40 becomes zero while controlling the motor 40 to allow the current command provided to the motor 40, i.e., a d-axis current and a q-current of the motor 40 to become zero, may be determined as the offset of the resolver 50.

This method mainly utilizes a voltage equation of an internal permanent motor (IPM) used in eco-friendly vehicles. The voltage equation of the IPM is known as the following Equation 1.

$$V_d = R_s i_d - \omega L_q i_q + \omega \varphi \sin \theta$$

$$V_q = R_s i_q + \omega L_d i_d + \omega \varphi \cos \theta \qquad \text{[Equation 1]}$$

In Equation 1, $V_d$ and $V_q$ are respectively a d-axis voltage and a q-axis voltage of the motor 40, $i_d$ and $i_q$ are respectively the d-axis current and the q-axis current of the motor 40, $L_d$ and $L_q$ are respectively d-axis inductance and q-axis inductance thereof, $R_s$ is resistance thereof, is a rotation speed thereof, $\Phi$ is a magnetic flux thereof, and $\theta$ is a rotation angle thereof.

In consideration of Equation 1, to allow the d-axis current, the q-axis current, and the d-axis voltage of the motor 40 become zero, the rotation angle $\theta$ should be zero. When the d-axis current, the q-axis current, and the d-axis voltage of the motor 40 are zero but the output signal of the resolver 50 denotes a specific angle, an offset may be determined as occurring in an output value of the resolver 50.

When the resolver offset calculator 130 sets a d-axis current command and a q-axis current command to zero, a d-axis voltage command output from the current controller 140 is zero, and the output signal of the resolver 50 denotes a specific angle, a value of the specific angle may be determined as an offset of the resolver 50.

As described above, according to various embodiments of the present invention, when distortion is determined as occurring in the output signal of the resolver 50 due to noise which occurs during an offset is determined, the offset of the resolver 50 is determined by employing the RPWM scheme for controlling the switching elements S1 to S6 in the inverter 30 with an arbitrary switching frequency. Consequently, it is possible to prevent distortion of a sampled signal due to noise resulting from switching which is simultaneously performed with the sampling point of time of the output signal of the resolver 50 such that accurate determination of the offset of the resolver 50 may be performed.

Figure 8:
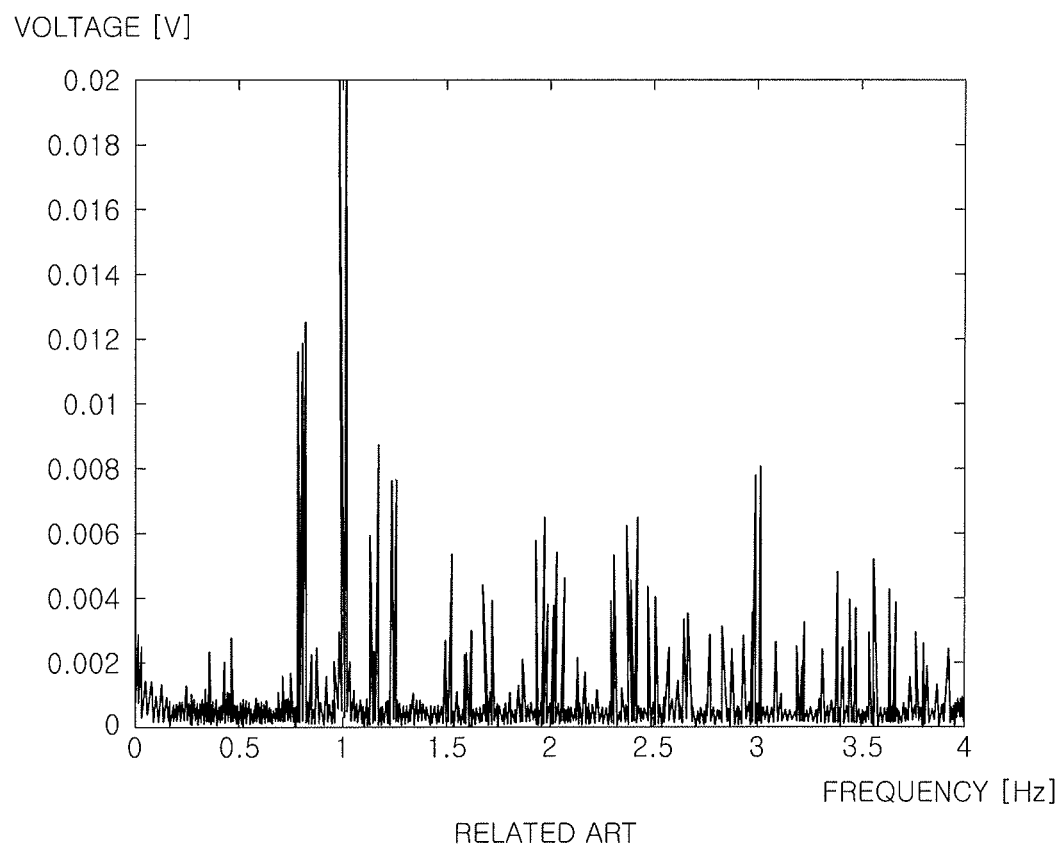
FIG. 8 and FIG. 9 are graphs showing fast Fourier transform results of an output signal of a resolver when a pulse width modulation scheme having a switching frequency of a fixed frequency is applied and when a random frequency modulation method is applied.
Figure 9:
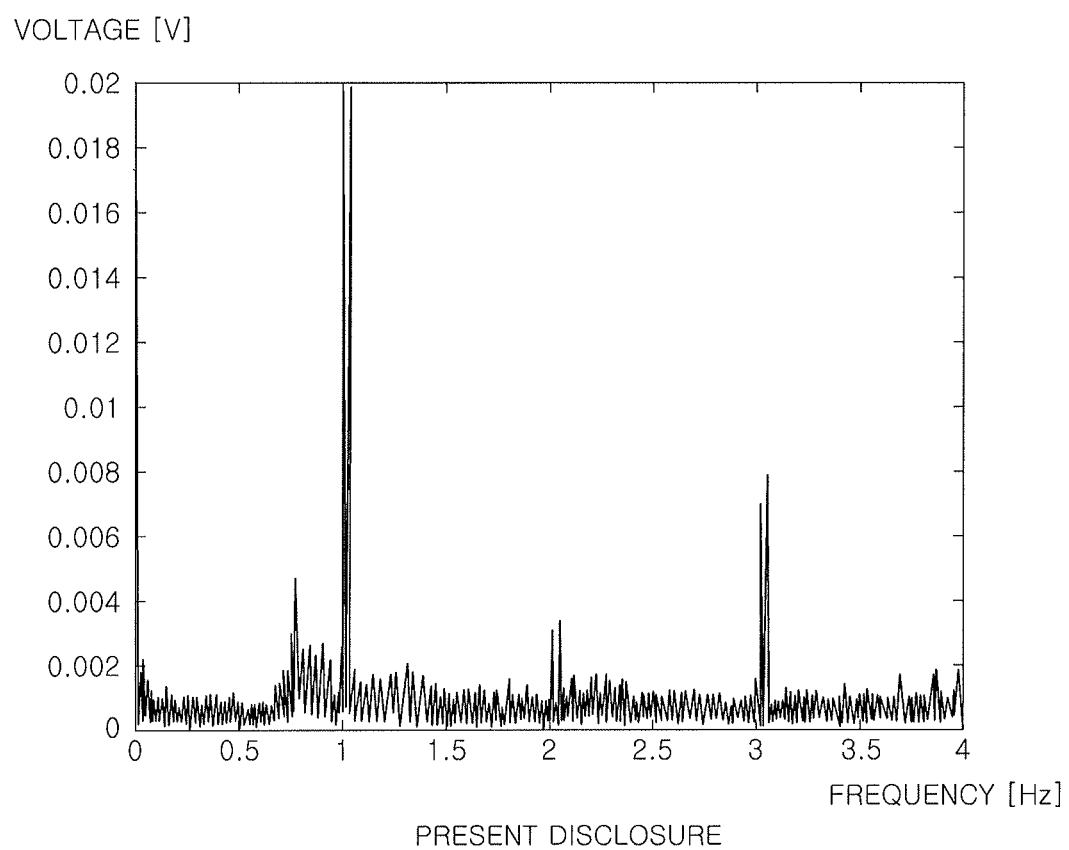

FIG. 8 and FIG. 9 are graphs showing fast Fourier transform results of an output signal of a resolver when a PWM scheme having a fixed switching frequency is applied and when a random frequency modulation method is applied.

As shown in FIG. 8 and FIG. 9, when an output signal of the resolver 50 is output in a case in which the PWM scheme having a fixed switching frequency is applied, severe distortion occurs in the output signal of the resolver 50 due to switching noise. However, when the RPWM scheme is applied, it may be confirmed that noise is reduced in an entire frequency range in addition that noise which is twice the switching frequency is significantly reduced from the output signal of the resolver 50.

Figure 10:
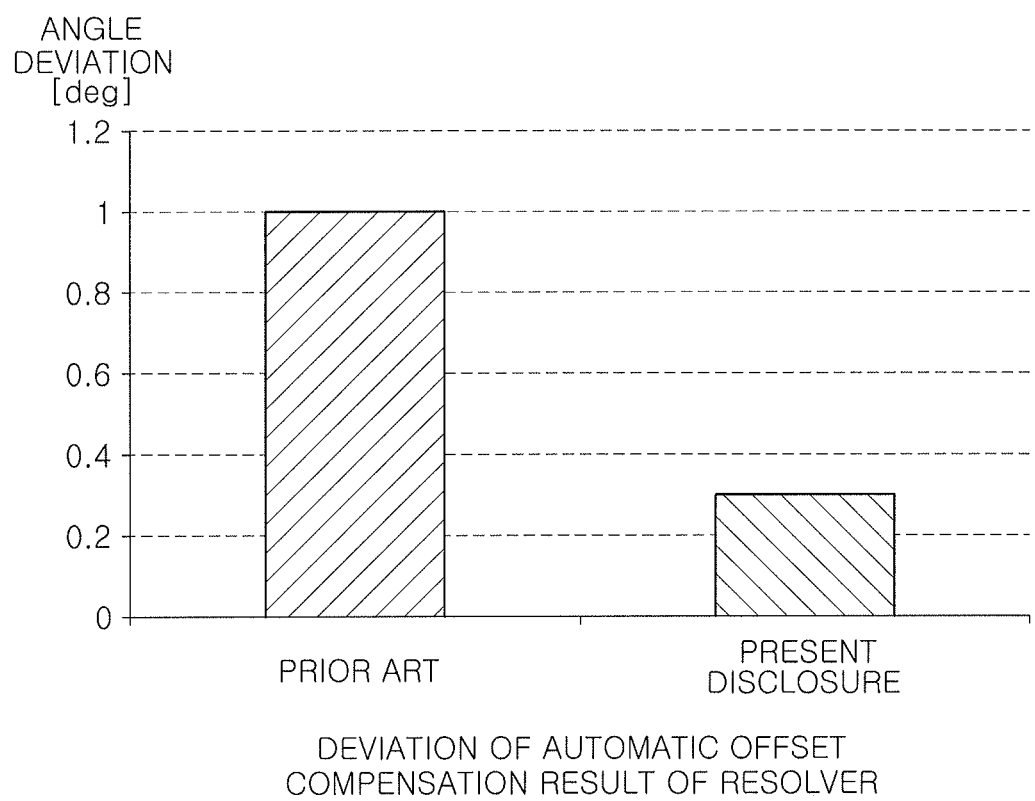
FIG. 10 is a graph comparing a deviation for compensation of an offset of a conventional resolver to which a pulse width modulation scheme having a switching frequency of a fixed frequency is applied with a deviation for compensation of an offset of the resolver according to an exemplary embodiment of the present invention.

FIG. 10 is a graph comparing a deviation for compensation of an offset of a conventional resolver to which a pulse width modulation scheme having a switching frequency of a fixed frequency is applied with a deviation for compensation of an offset of the resolver according to an exemplary embodiment of the present invention.

As shown in FIG. 10, in the conventional case, when the offset of the resolver 50 is compensated, an angle deviation is exhibited close to 1 degree due to distortion of the output signal of the resolver 50. However, when the offset of the resolver 50 is compensated by applying the RPWM scheme according to an exemplary embodiment of the present invention, a degree of distortion of the output signal of the resolver 50 is improved such that it may be confirmed that a compensation deviation of the offset of the resolver 50 is improved within about 0.3 degrees.

According to the method and the system for compensating an offset of a resolver, when distortion is determined as occurring in an output signal of the resolver due to noise which occurs during an offset is determined, the offset of the resolver is determined by employing the RPWM scheme for controlling switching elements in an inverter with an arbitrary switching frequency. Consequently, it is possible to prevent distortion of a sampled signal due to noise resulting from switching which is simultaneously performed with the sampling point of time of the output signal of the resolver such that accurate determination of the offset of the resolver may be performed.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A method for compensating an offset of a resolver, the method comprising:
    sampling, by a controller, an output signal of the resolver at a predetermined sampling frequency;
    comparing, by the controller, magnitudes of sampled output signals of the resolver in the step of sampling;
    when a difference between the magnitudes of the sampled output signals of the resolver is greater than a predetermined reference value, controlling, by the controller, a motor with a random pulse width modulation (RPWM) scheme for arbitrarily changing a switching frequency of a switching element in an inverter connected to the motor; and
    compensating the offset of the resolver coupled to the motor while controlling the motor with the RPWM scheme,
    wherein the comparing includes determining a difference between magnitudes of two consecutive sampled output signals of the resolver among magnitudes of sequentially sampled output signals of the resolver at the predetermined sampling frequency.

2. The method of claim 1, wherein the sampling includes sampling the output signal of the resolver using the predetermined sampling frequency which is determined to sample the output signal of the resolver at a peak of the output signal of the resolver.

3. The method of claim 1, wherein the predetermined reference value is determined as a maximum value with which a difference between peak values of adjacent output signals of the resolver has in a state in which distortion is not present in an output of the resolver.

4. The method of claim 1, wherein the compensating of the offset of the resolver includes, when a d-axis voltage of the motor becomes zero, determining an angle determined by the output signal of the resolver as the offset of the resolver coupled to the motor while controlling the motor to put a d-axis current and a q-axis current of the motor into zero.

5. A system for compensating an offset of a resolver, which provides an output signal for determining a rotation angle of a motor driven by receiving alternating-current (AC) power converted by switching of a switching element in an inverter connected to the motor, the system comprising:
 a sampler configured to sample an output signal of the resolver at a predetermined sampling frequency;
 a modulation scheme determiner configured to compare magnitudes of sampled output signals of the resolver by the sampler, and when a difference between the magnitudes of the sampled output signals of the resolver is greater than a predetermined reference value, control the motor with a random pulse width modulation (RPWM) scheme for arbitrarily changing a switching frequency of the switching element in the inverter; and
 a resolver offset calculator configured to determine the offset of the resolver on a basis of the output signal of the resolver while driving the motor with a modulation scheme determined by the modulation scheme determiner,
 wherein the modulation scheme determiner determines a difference between magnitudes of two consecutive sampled output signals of the resolver among magnitudes of sequentially sampled output signals of the resolver at the predetermined sampling frequency.

6. The system of claim 5, wherein the sampler samples the output signal of the resolver using the predetermined sampling frequency which is determined to sample the output signal of the resolver at a peak of the output signal of the resolver.

7. The system of claim 5, wherein the predetermined reference value is determined as a maximum value with which a difference between peak values of adjacent output signals of the resolver has in a state in which distortion is not present in an output of the resolver.

8. The system of claim 5, wherein, when a d-axis voltage of the motor becomes zero, the resolver offset calculator determines an angle determined by the output signal of the resolver as the offset of the resolver coupled to the motor while controlling the motor to put a d-axis current and a q-axis current of the motor into zero.

* * * * *